March 14, 1961
W. D. WEGLEY
2,975,351
PITCH CONTROL MECHANISM FOR AIRCRAFT
Filed Feb. 18, 1958
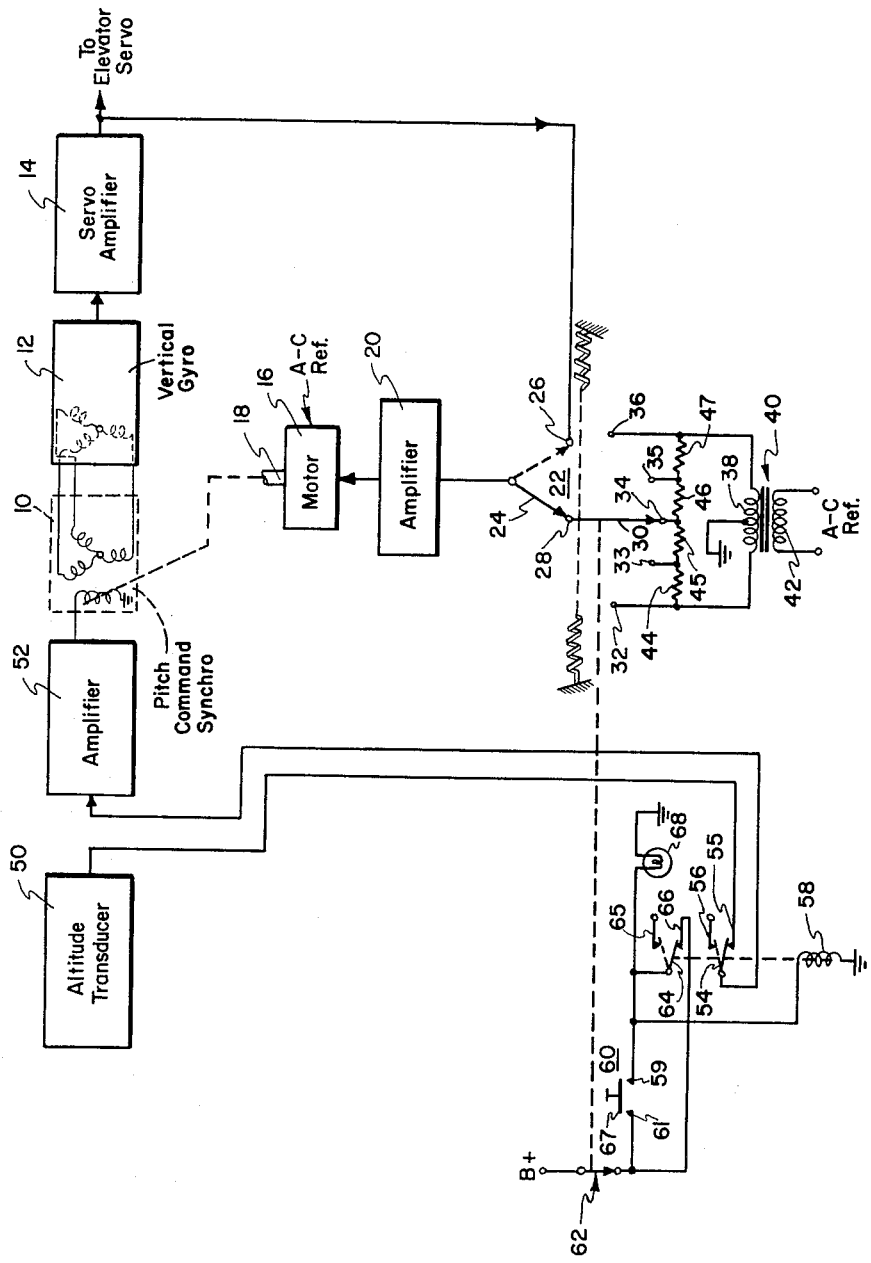
INVENTOR.
WESLEY D. WEGLEY
BY
*Harold J. Downes*
ATTORNEY

United States Patent Office 2,975,351
Patented Mar. 14, 1961

2,975,351
PITCH CONTROL MECHANISM FOR AIRCRAFT

Wesley D. Wegley, Canoga Park, Calif., assignor to Lear, Incorporated

Filed Feb. 18, 1958, Ser. No. 715,915

7 Claims. (Cl. 318—489)

This invention relates to flight control means for aircraft, and more particularly to an improved system for controlling the pitch attitude of an aircraft.

Automatic pilots usually incorporate a feature for automatically controlling the pitch attitude of an aircraft. For example, it may be put into an "altitude hold" mode in which the output of an altitude transducer is fed to the autopilot and utilized thereby to maintain the aircraft at a constant altitude. In another aspect, an "altitude capture" mode is incorporated, wherein signal information representing a new and different altitude for the aircraft is fed to the autopilot to change the pitch attitude of the aircraft and keep it in that attitude until the new altitude is reached, at which the aircraft is automatically leveled off. Throughout such modes of operation it is always possible to change the pitch attitude of an aircraft manually, as by rotating the rotor of a pitch command synchro device, i.e., manual override of the automatic pitch control is provided. It is of course desirable and oftentimes essential that the automatic pitch control means be disconnected from the autopilot when changing to manual control. The reason for this is that if the automatic pitch control means is left engaged during manual pitch control operations, such automatic means will take over after the manual control is released and thereby cause the aircraft to be maneuvered back to the condition of flight that existed prior to the institution of manual controls. Unfortunately, the pilot occasionally forgets or neglects to disconnect the automatic control means, usually because he has so many matters which occupy his attention at the same time. The consequences can be disastrous where, for example, the pilot on approaching an airport is directed to move to a higher altitude so that programming of landings of other aircraft in the area will not be interfered with. At this time, the pilot is engaged in observing the movements of numerous instruments or indicators in the cockpit, and he may operate the manual controls to direct the aircraft to the new altitude without disengaging the "altitude hold" mode. Upon reaching the new altitude, he will release the manual control and redirect his attentions to the various other problems that beset him at the moment. As soon as the manual control is released, the automatic control means take over and redirect the aircraft to the former altitude, where it may be flown into the path of another aircraft and cause a mid-air collision and consequent loss of pilots, passengers and planes.

It is therefore an important object of this invention to provide improved automatic pitch control means for aircraft, in which automatic pitch control means is automatically disengaged when manual pitch control of the aircraft is instituted by the pilot.

It is another object of this invention to provide an improved manual pitch control means for aircraft to effect a change in the pitch rate of the aircraft.

A further object of this invention is to provide improved switching means for use in conjunction with automatic and manual pitch control means for an aircraft, which ensures disconnection of the automatic pitch control means when the pilot is controlling the pitch attitude of the aircraft manually.

Still another object of this invention is to provide improved means for manually controlling the pitch rate of an aircraft from a remote position.

It is yet another object of this invention to provide an improved combination for automatically and manually controlling the pitch attitude of an aircraft, which is inherently safer than prior art combinations used for this purpose, which comprises a minimum number of component parts of simple design, and which is "fail-proof" in ensuring the disconnection of automatic control means during manual operation.

The above and other objects and advantages of this invention will become apparent from the following description taken in conjunction with the accompanying drawing, which illustrates a preferred embodiment of the invention.

In the drawing, the sole figure is a combined block and schematic diagram of an improved pitch attitude control system, in accordance with this invention.

Referring to the drawing, the invention will be described with reference to an "altitude hold" mode for an autopilot. The autopilot is also provided with a synchronizing mode which operates in a conventional manner to control the elevators so as to maintain the pitch attitude existing at the time the synchronizing mode is initiated.

The frame of reference for both the "altitude hold" and synchronizing modes of the autopilot, and also for manual control of pitch attitude, is the combination of a pitch command synchro device 10, a vertical gyroscope 12, and a servo amplifier 14 which supplies signals to the elevator servo (not shown). The stator windings (not shown) of the pitch command synchro and vertical gyroscope are directly connected, and the output of the gyroscope 12 is connected to the servo amplifier 14. The output of the pitch command synchro depends upon the position of its rotor and is a signal which is equal in magnitude but opposite in phase to that of the vertical gyroscope when the aircraft is maintaining a fixed attitude. For the fixed attitude situation, which is the synchronizing mode for the autopilot, the pitch synchro rotor must be maintained in a position to ensure that the outputs of the pitch synchro and vertical gyroscope are equal and opposite. To this end, a motor 16 has its output shaft 18 connected to the rotor of the synchro; and the motor, which is a conventional two-phase motor, is driven or controlled by signals from the output of an amplifier 20 which, in turn, receives the output of servo amplifier 14.

As shown, signals to amplifier 20 are controlled through a single-pole double-throw switch 22. In the synchronizing mode, the switch arm 24 of the switch is connected, as shown by the dotted connection, to the terminal 26 thereof, which is connected to the output of servo amplifier 14.

With the arrangement above-described, it will be seen that for any difference between the outputs of the pitch command synchro 10 and the vertical gyroscope 12 which exists when the switch 22 is initially placed in the synchronizing position, the elevator servo will be caused to operate the elevators until such output signals are equal and opposite, after which the existing attitude is maintained.

The remaining position 28 of switch 22 is effected when the autopilot is engaged. In this position, the improved manual control means of this invention for controlling the pitch attitude of the aircraft may be operated. Such control is effected by manipulation of the switch arm 30 of a multiple-position switch. For purposes of illustration, a five-position switch is shown in which the outer terminals 32, 36 are connected to the ends of a centertapped secondary winding 38 of a transformer 40 having its primary winding 42 adapted to receive a reference voltage. Four resistors 44, 45, 46 and 47 are connected between terminals 32 and 36, and the remaining terminals 33, 34 and 35 are connected to the junctions of adjacent pairs of these resistors. Further, resistors 45 and 46, and resistors 44 and 47, are chosen to be equal, so that the total resistance on either side of terminal 34 is the same. By such an arrangement, terminal 34 will be recognized as a neutral position and with switch arm 30 in that position (assuming switch 22 is in the autopilot "engage" position 28), no voltage will be applied to amplifier 20 to drive motor 16. In any other position of switch arm 30, a voltage of fixed magnitude will be applied to amplifier 20, whereupon motor 16 will be driven at a constant speed. This results in a constant rate of turn of the pitch synchro rotor, and hence a constant rate of change of the magnitude of the output signals of pitch synchro 10. Accordingly, signals will be developed in servo amplifier 14 to cause the elevator servo to institute a predetermined pitch rate for the aircraft, i.e., a pitch rate depending upon the magnitude of the voltage applied to amplifier 20 through switch arm 30.

It will be noted that, unlike prior art arrangements for controlling the pitch attitude of an aircraft manually wherein manual control would be effected by turning the rotor of the pitch command synchro directly, this invention provides manual control means operable remotely to effect the desired change. Furthermore, the arrangement of this invention permits the pitch rate of the aircraft to be changed manually, in contrast to prior art systems where manual control can be utilized only to change the pitch angle of the aircraft.

To hold the aircraft at any desired altitude, signals from an altitude transducer 50 are applied through an amplifier 52 to the pitch command synchro 10. The connection is effected through a relay having an armature 54 connected to the input of amplifier 52, and one contact 55 of an associated pair of contacts 55, 56 connected to the output of transducer 50. The ungrounded end of the relay coil 58 is connected to one contact 59 of a push-button type switch 60; the remaining contact 61 of switch 60 is connected through another switch 62 to the positive terminal of a D.-C. voltage source. When relay coil 58 is not energized, armature 54 is in contact with the floating contact 56, as indicated by dotted line connection. With switches 62 and 60 closed, the relay coil is energized to throw the armature 54 against contact 55 and thereby connect the output of altitude transducer 50 to the input of amplifier 52.

A second armature 64 having an associated pair of contacts 65, 66 is connected to terminal 59 of switch 60; contact 66 is directly connected to the terminal 61 of switch 60. Since switch 60 is a push-button type apparatus, its contact element 67 effects a direct connection between its terminals 59, 61 when it is momentarily depressed, whereupon relay coil 58 is connected between B+ and ground to actuate armatures 54, 64, and throw them against contacts 55 and 66. A lamp 68 connected between armature 64 and ground will thereafter remain on through the direct connection established through armature 64 and contact 66 to B+ (so long as switch 62 is closed).

From the foregoing, it will be apparent that operation of selector arm 30 for manual control of pitch attitude is incompatible with the "altitude-hold" function wherein signals are fed from altitude transducer 50 to amplifier 52. As previously explained, if manual control is instituted while maintaining the connection between transducer 50 and amplifier 52, the pilot upon reaching the new altitude achieved during manual control will allow the selector arm 30 to return to its neutral position 34, and thereafter signals from altitude transducer 50 will command the pitch attitude and direct the aircraft to a different altitude than that desired. Accordingly, and in accordance with this invention, selector arm 30 and switch 62 are interconnected mechanically so that when selector arm 30 is at any time removed from its neutral position 34, the D.-C. voltage source is removed from relay 58. In this manner there is never any doubt that when the pilot assumes manual control of the pitch attitude of an aircraft, the incompatible "altitude-hold" function is removed from the autopilot. Accordingly, when the selector arm 30 is returned to the neutral position after a desired altitude is reached, it will be necessary for the pilot to again depress the push-button switch 60 in order to establish the "altitude-hold" function.

To further aid in informing the pilot that his "altitude-hold" function is disconnected, lamp 68 is preferably mounted on the instrument panel, along with push-button switch 60 and selector arm 30. As soon as selector arm 30 is moved from its neutral position, whereupon switch 62 disconnects the D.-C. voltage source from the relay and its associated armatures, lamp 68 goes out. If at any time thereafter the pilot wishes to ascertain whether or not the aircraft is flying under automatic "altitude-hold" conditions, and he desires that the "altitude-hold" function be operative, a glance at the lamp on the instrument panel will inform him that it is not presently operable and that he must depress push-button 60 in order to establish that function.

Although the foregoing has been described with reference to interconnection between manual control and automatic control means for "altitude-hold," it will be apparent that this invention can be readily utilized in connection with other automatic modes for controlling the pitch attitude of an aircraft. For example, an additional relay and associated armatures and contracts and lamps can be connected in parallel with that here illustrated and described; such may be utilized, for example, for an "altitude-capture" mode or a "Mach control" mode. It will be noted that such additional modes are also incompatible with manual control, i.e., return of selector arm 30 to its neutral position after manual control would, if the pilot desired to maintain the condition obtained under manual control, require that these automatic modes not be thereafter in control of the aircraft. Since selector arm 30 and switch 62 are directly ganged, initial movement of selector arm 30 from its neutral position will actuate switch 62 and thereby disconnect each arrangement which would be capable of performing an incompatible function. Thereafter, the pilot would have to selectively depress the push-button associated with the arrangement before the automatic function would become operative.

For the sake of convenience, switch arm 30 preferably would be pivotally mounted on the instrument panel for movement in two opposed directions from a neutral or detent position and would be spring-loaded to ensure its automatic return to neutral after it is released by the pilot.

Although the invention has been described and illustrated in detail it is to be clearly understood that the same is by way of illustration and example only and is not to be taken by way of limitation, the spirit and scope of this invention being limited only by the terms of the appended claims.

What is claimed is:

1. In combination with a synchro device having stator and rotor windings, wherein the rotor winding is supported on a rotor, wherein the synchro device develops an output signal upon the application of signals to the stator windings, and wherein the amplitude and phase of the output signal varies with the position of the rotor, a source of signals to be connected to the stator windings, relay means to connect said source to the stator windings, a motor having its output shaft connected to the rotor, means including a first manually operable switch for controlling the operation of the motor to effect rotation of the rotor at a predetermined speed, a second manually operable switch to connect the relay means to a source of energizing voltage, and said switches being directly connected to permit the second switch to disconnect said relay means from the energizing voltage source upon actuation of said first switch.

2. In an aircraft having a vertical gyroscope to develop signals representing the pitch attitude of the aircraft in space, and a pitch command synchro device developing an output signal which is equal and opposite to the output of the vertical gyroscope when the aircraft is maintaining a fixed pitch attitude, the synchro device having a rotor and developing an output signal corresponding to the position of the rotor, and wherein a servo amplifier effects positioning of the aircraft elevator surfaces in response to the net output of the synchro device and the gyroscope, motor means operatively connected to the rotor, manual control means operable through said motor means for selectively rotating the rotor of the synchro device at a predetermined speed to effect a predetermined pitch rate of change in the pitch attitude of the aircraft, a source of signals representing a desired pitch command for the aircraft, relay means to connect said last-named means to the synchro device, manually operable switch means to energize said relay means, and said manual control means and manually operable switch means being mechanically connected so that upon manipulation of said manual control means said switch means is actuated to disconnect the synchro device from the source of signals.

3. In an aircraft having a synchro device and an attitude gyroscope coupled to a servo amplifier for actuating control surfaces, wherein the synchro device has a rotor and a winding thereon for varying the output of the synchro device, the combination of a motor adapted to drive the rotor of the synchro device, a first switch for connecting the motor to the output of the servo amplifier to operate the rotor until the output of the synchro device is equal and opposite to the output of the gyroscope when the aircraft is maintaining a fixed attitude, a second switch adapted to be placed in contact with a predetermined voltage, and said first switch being adapted to be connected to said second switch to effect operation of the rotor of the synchro device at a constant speed corresponding to the magnitude of said predetermined voltage, thereby to effect a constant attitude rate change of the aircraft which corresponds to said predetermined voltage.

4. In an aircraft having a synchro device and a vertical gyroscope, wherein the gyroscope develops signals representing the pitch attitude of the aircraft, the synchro device and gyroscope being connected to a servo amplifier to effect operation of the elevators in response to the output of the synchro device and gyroscope, and wherein the synchro device employs a rotor and a winding thereon which can be rotated to vary the output of the synchro device, the combination of a motor operatively connected to the rotor, means including a first manually operable switch for controlling the operation of the motor to effect rotation of the rotor at a predetermined speed, a source of signals representing a desired pitch command for the aircraft, relay means to connect said last-named means to the synchro device, a second manually operable switch to connect said relay means to a source of energizing voltage, and said switches being directly connected to permit the second switch to disconnect said relay means from the source of energizing voltage upon actuation of said first switch.

5. The combination defined in claim 4, wherein said first manually operable switch is adapted to be connected selectively to one of a plurality of points of voltage potential, and wherein said first switch includes means for automatically returning it to the neutral position upon its release after being moved to one of said plurality of points of potential.

6. In an aircraft having a synchro device and an attitude gyroscope, wherein the gyroscope develops signals representing the pitch attitude of the aircraft, wherein the synchro device and gyroscope are connected through a servo amplifier to effect operation of the elevators in accordance with the algebraic sum of the outputs of the synchro device and gyroscope, and wherein the synchro device employs a rotor and a winding thereon adapted to be turned to vary the output of the synchro device, a motor adapted to drive the rotor, a first switch for connecting the motor to the output of the servo amplifier to effect positioning of the rotor so that the output of the synchro device is an equal and opposite signal to the gyroscope output signal when the aircraft is in a fixed attitude, means including a second switch for controlling the operation of the motor to effect rotation of the rotor at a predetermined speed, a source of signals representing a desired pitch command for the aircraft, relay means to connect said source to the synchro device, a third manually operable switch to connect said relay means to a source of energizing voltage, and said second and third switches being mechanically connected in a manner to cause said second switch to disconnect said relay means from the source of energizing voltage during actuation of said second switch.

7. In an aircraft having a synchro device and an attitude gyroscope, wherein the attitude gyroscope develops signals representing a predetermined attitude of the aircraft, wherein the synchro device and gyroscope are coupled to a servo amplifier which positions the elevators in response to the net outputs of the synchro device and gyroscope, and wherein the synchro device employs a rotor and a winding therefor which can be operated to vary the output of the synchro device, a motor adapted to drive the rotor, means including a manually operable switch for controlling the operation of the motor to effect rotation of the rotor at a predetermined speed, and said switch having a neutral position in which said motor means is not operable, said switch including spring-biasing means to ensure its return to the neutral position upon its release from any other position and further including a source of signals representing a desired pitch command for the aircraft, a second manually operable switch to connect said source to the synchro device, and said switches being directly connected so that upon actuation of said first switch, said second switch effects disconnection of said source from the synchro device, further including a source of signals representing a desired pitch command for the aircraft, a second manually operable switch to connect said source to the synchro device, and said switches being directly connected so that upon actuation of said first switch, said second switch effects disconnection of said source from the synchro device.

References Cited in the file of this patent
UNITED STATES PATENTS

| | | |
|---|---|---|
| 2,636,699 | Jude et al. | Apr. 28, 1953 |
| 2,662,705 | Anderson et al. | Dec. 15, 1953 |
| 2,879,015 | Ardia | Mar. 24, 1959 |